(No Model.)

E. V. CLEMENS.
SHAFT HANGER.

No. 269,263. Patented Dec. 19, 1882.

Witnesses:

Ernest V. Clemens
Inventor
By atty

UNITED STATES PATENT OFFICE.

ERNEST V. CLEMENS, OF ANSONIA, CONNECTICUT.

SHAFT-HANGER.

SPECIFICATION forming part of Letters Patent No. 269,263, dated December 19, 1882.

Application filed November 4, 1882. (No model.)

*To all whom it may concern:*

Be it known that I, ERNEST V. CLEMENS, of Ansonia, in the county of New Haven and State of Connecticut, have invented a new Improvement in Shaft-Hangers; and I do hereby declare the following, when taken in connection with accompanying drawings and the letters of reference marked thereon, to be a full, clear, and exact description of the same, and which said drawings constitute part of this specification, and represent, in—

Figure 1:
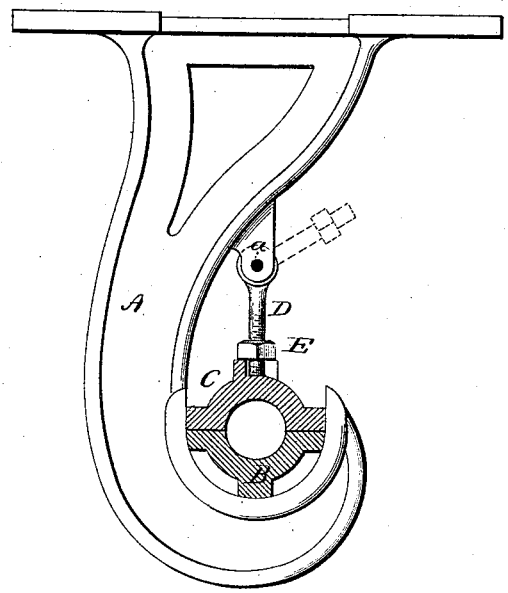
Figure 2:
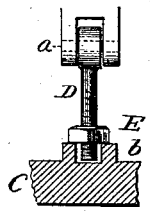

Figure 1, a side view; Fig. 2, a partial front view.

This invention relates to an improvement in the construction of hangers used in manufactories to support the bearings for shafting. In this class of hangers it is necessary that the cap over the bearing shall be secured in its place upon the shaft. There are numerous devices for securing the cap, that most common being the introduction of a screw into a threaded hole above the box, and so that the screw may be turned down to take its bearing on the top of the box and hold it in place. Then when it is required to remove the cap the screw must be run into its hole to a sufficient extent to permit the cap to be removed. In all the devices in which screws are used for securing the cap the screws are required to be turned a number of revolutions to clear the box. In many cases the screws are detachable, and offer an additional inconvenience because of the liability of dropping or misplacing the screws when removing or replacing the cap.

The object of my invention is to overcome difficulties existing in this class of hangers, and to make the screw a permanent part of the hanger; and it consists in a screw hinged to the hanger above the cap, with a nut on the screw, which may be forced down upon the cap to hold it in place, and the cap released by slightly unscrewing the nut, and then turning the screw upon its hinge out of the way of the cap, as more fully hereinafter described.

A represents the hanger, which may be of any of the usual constructions; B, the lower part of the box; and C, the upper part or cap, arranged in the usual position in the hanger and in the usual manner.

Centrally above the cap a screw, D, is hinged to the hanger, as at *a*, and so as to swing into a vertical position over the cap or be turned away from that position, as indicated in broken lines, Fig. 1. The cap C is fitted with a socket, *b*, into which the lower end of the screw D will pass as it is turned down into a vertical position.

On the screw is a nut, E, which, when the screw is brought into its vertical position with its lower end in the socket, the nut may be turned on the screw down, and so as to bear upon the socket and hold the cap in place. Then when it is desired to remove the cap it is only necessary to unscrew the nut to an extent which will permit the screw to swing outward and away from its position over the cap, taking the end from over the socket, say, into the position seen in broken lines, Fig. 1. Then the way is open for the removal of the cap, and this is accomplished by but a slight turning of the nut. Then when the cap is replaced it is only necessary to bring the screw down into its vertical position and return the nut to its bearing. By this construction the screw is always in its place, cannot be lost, the nut is turned onto the screw when releasing the box, instead of off, as in the bolts sometimes employed to secure the cap, it is easy of adjustment, and adds nothing to the cost of the hanger over the common vertical screw and tapped hole in the hanger.

Instead of constructing the cap with a socket, the screw may be so short that its lower end will just clear the cap, then the nut turned down so as to bear directly upon the cap, and accomplish substantially the same result; yet I prefer a socket having one side open and through which opening the screw will swing into and from the socket, as shown.

I claim—

1. The combination of the hanger, box, and cap, which form a bearing for the shaft, with a screw hinged by its upper end to the hanger above the cap, and a nut on the screw to bear upon the cap or to release the cap, so that the screw may be turned away from over the cap, substantially as described.

2. The combination of the hanger, box, and cap, which form a bearing for the shaft, with a screw hinged by its upper end to the hanger above the cap, the cap constructed with a socket to receive the lower end of the screw, and a nut on the screw to bear on said socket, substantially as described.

E. V. CLEMENS.

Witnesses:
THOMAS J. WOOD,
EDSON L. BRYANT.